(12) United States Patent
Gellerich

(10) Patent No.: US 8,239,959 B2
(45) Date of Patent: Aug. 7, 2012

(54) METHOD AND DATA PROCESSING SYSTEM TO PREVENT MANIPULATION OF COMPUTER SYSTEMS

(75) Inventor: Wolfgang Gellerich, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 338 days.

(21) Appl. No.: 12/599,157

(22) PCT Filed: Mar. 4, 2008

(86) PCT No.: PCT/EP2008/052600
§ 371 (c)(1),
(2), (4) Date: Nov. 19, 2009

(87) PCT Pub. No.: WO2008/138653
PCT Pub. Date: Nov. 20, 2008

(65) Prior Publication Data
US 2010/0306848 A1    Dec. 2, 2010

(30) Foreign Application Priority Data
May 9, 2007 (EP) .................................... 07107791

(51) Int. Cl.
*G06F 21/00* (2006.01)
(52) U.S. Cl. ................ 726/26; 726/27; 726/34
(58) Field of Classification Search ................ None
See application file for complete search history.

(56) References Cited

U.S. PATENT DOCUMENTS

| | | | |
|---|---|---|---|
| 6,009,518 A * | 12/1999 | Shiakallis | 713/1 |
| 6,330,648 B1 | 12/2001 | Wambach et al. | |
| 2002/0166062 A1* | 11/2002 | Helbig, Sr. | 713/200 |
| 2005/0172144 A1* | 8/2005 | Shao | 713/200 |
| 2005/0188425 A1* | 8/2005 | Horn | 726/34 |
| 2006/0047860 A1 | 3/2006 | Lin | |
| 2006/0230455 A1 | 10/2006 | Lo et al. | |
| 2006/0288180 A1 | 12/2006 | Shih et al. | |
| 2007/0005919 A1 | 1/2007 | van Riel | |

FOREIGN PATENT DOCUMENTS

| | | |
|---|---|---|
| WO | WO 93/09498 | 5/1993 |
| WO | WO 93/19413 | 9/1993 |

* cited by examiner

*Primary Examiner* — Ponnoreay Pich
(74) *Attorney, Agent, or Firm* — Roy W. Truelson (57) ABSTRACT

A method and system prevents data stored in a computer system from being manipulated, particularly via hacker attacks and virus infection. The computer system comprises means for switching a portion of system memory into a write-protected mode which is exclusively operable from outside of the computer's operating system. During boot or during an installation process of an application program, writing to a write-protectable area is temporarily enabled, and security-relevant information is written into said write-protectable area. A user is then prompted to perform a manual switching to restrict writing to said write-protectable area, and write access to said write protected area is thereafter restricted in response to said manual switching during further runtime of said computer system.

7 Claims, 5 Drawing Sheets

PRIOR ART

ID AND DATA PROCESSING SYSTEM
TO PREVENT MANIPULATION OF
COMPUTER SYSTEMS

1. BACKGROUND OF THE INVENTION

1.1. Field of the Invention

The present invention relates to the field of computer technology, and relates in particular to a method and system and device to prevent computer programs and data of any kind stored in a computer system from being manipulated and in particular for preventing hacker attacks and virus infection in computer systems.

1.2. Description and Disadvantages of Prior Art

Computer programs, referred to herein as computer applications, often include security-critical use cases, where failure may cause significant financial losses, pollution of the environment, or even endanger human lives. Frequently cited examples include computer systems controlling military equipment or nuclear power plants. However, also emerging areas such as internet-based business like online banking essentially depend on the integrity of data stored in and exchanged between computer systems. Also, the operation of most of today's companies depends on the availability of computer systems and on the integrity of the data stored therein.

Disadvantageously, prior art computer systems are prone to many kinds of so-called hacker attacks. These attacks seek to modify computer programs, to modify data stored in a computer system, or to obtain copies of the programs or data. Two major kinds of such attacks are virus infections and manipulations to programs or data performed by hacker attacks.

A computer hacker tries to get access in some way to the computer system under attack. These attacks include stealing or guessing passwords, or the exploitation of some bugs within the computer system's security mechanism. A typical example of the latter hacking technique is to exploit buffer overflows which, under certain circumstances, may cause the computer system to execute a computer program provided by the hacker.

However, this process of getting unauthorized access to a computer system usually takes lots of time and may simply depend on a lucky chance. Also, it is often the case that the hacker only achieves somewhat limited access rights during the first phase of the attack. After having entered a computer system for the first time, hackers therefore often try to modify the system software controlling the computer system in a way that will provide easy access for the hacker in future, grant additional rights to the hacker, and hides the hacker's modifications and activities from getting discovered by the system administrator. This is understood to implement a "backdoor" for later entering the system again.

For the Linux operating system, such techniques are discussed in certain magazines, and software packages that support the hacker are freely available from certain web sites.

The modifications described above usually require storing some additional files in the computer system under attack. Part of the hacker's activities is to prevent these files from getting discovered.

Figure 1:
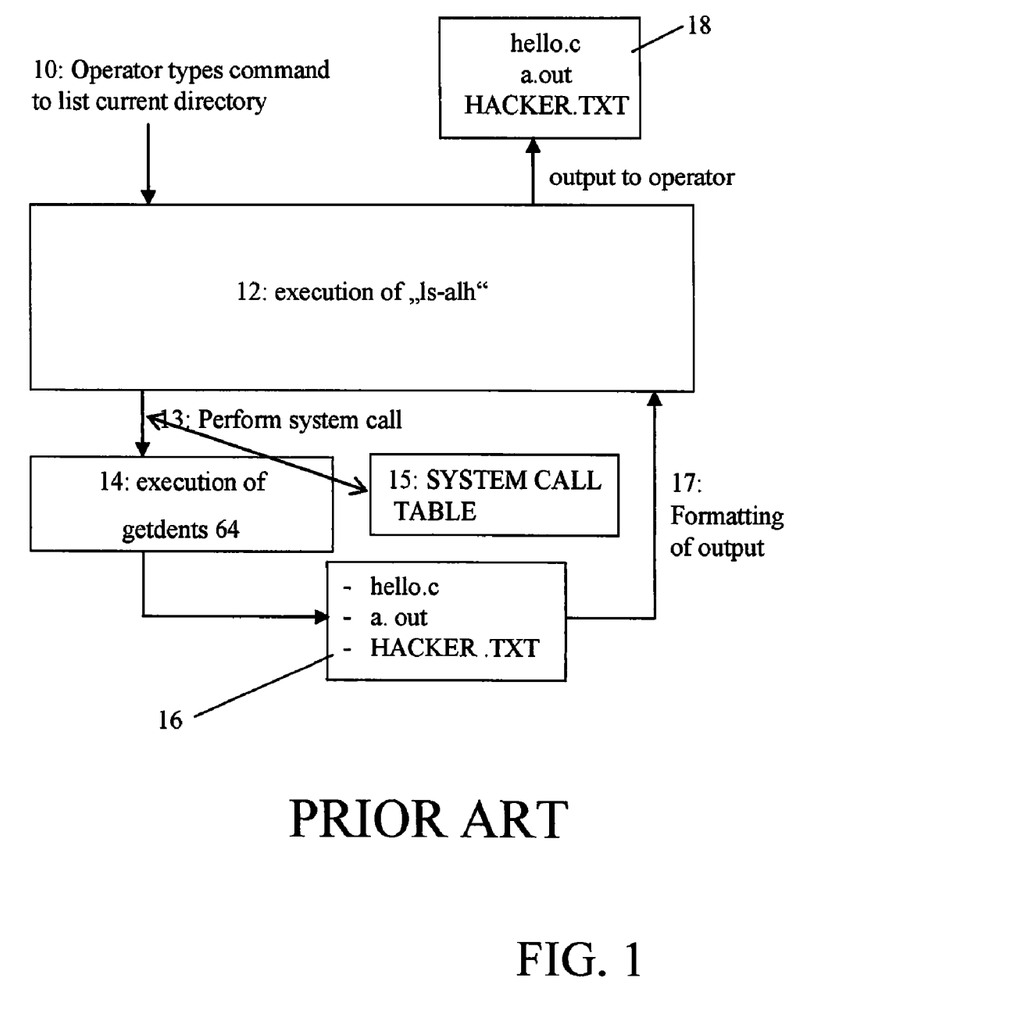
FIG. 1 is a schematic control flow diagram illustrating the control flow when executing a LINUX command "ls" in order to display some files of the associated LINUX file system.
Figure 2:
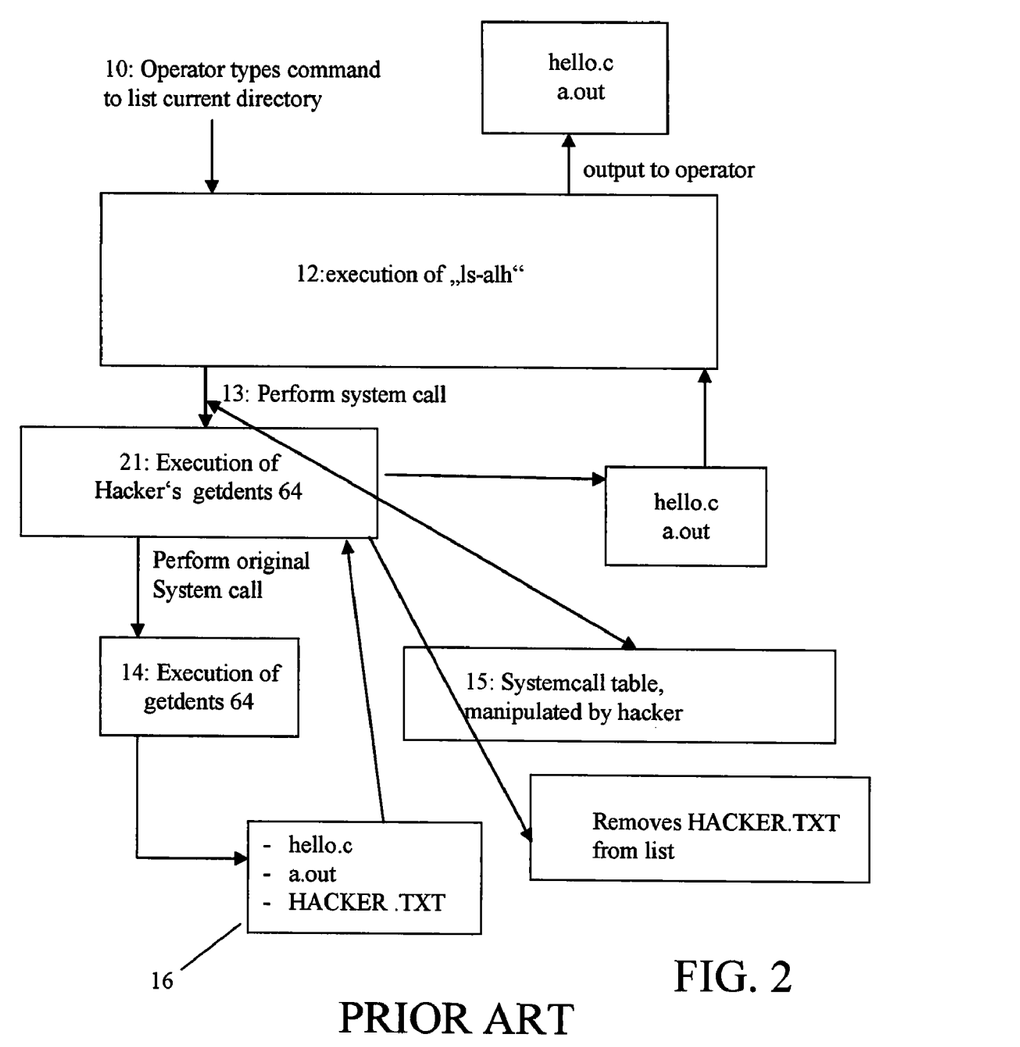
FIG. 2 is a schematic control flow diagram illustrating a hacker attack on a LINUX operating system by modifying the LINUX command "ls" (prior art)

FIGS. 1 and 2 show a typical example of how a hacker would modify a computer system running Linux as operating system in order to hide files he needs. The Linux command for getting a list of all files stored in the current directory is "ls", usually with some options, say, "-alh".

FIG. 1 illustrates how this command after being entered by a user in a step 10 is executed by a Linux system. Once the operator typed this command, the execution 12 of the ls operation will make a so-called system call 13 which is the Linux name for certain services provided by the Linux kernel. In this case, a system call named "getdents64" (an abbreviation for "get directory entries") stored in a memory region as some data structure (named "sys_call_table"), i.e. a system call table 15, will be executed and returns a list 16 of all files found in the current directory to its caller, the ls program. The ls program then performs some formatting of the list in a step 17, as required by the operator by means of the options "-alh". Finally, the formatted list 18 of files appears of the display.

It is assumed now that the directory contains one of the files, say HACKER.TXT, that the hacker wants to hide. This is done by a modification to the Linux system, as shown in FIG. 2. Here, the original system call named "getdents64" is replaced by the hacker's version 21, named "hackers_getdents64". In the case of Linux, replacing system calls is done by modifying an entry in the system call table 15.

The system call issued by the ls program calls "hackers_getdents64". This program will, when executed in step 21 then call the original system call 14, getdents64, in order to obtain the list 16 of files. The original system call returns this list to its caller, hackers_getdents64, which then searches the list for names of files that the hacker wants to suppress, i.e. not to be displayed. In this example, hackers_getdents64 will remove the name HACKER.TXT from the list and return the list of the remaining files to the ls program which then formats and finally displays the result, as described before with reference to FIG. 1.

Virus infection also involves modifications to programs stored in a computer system. A major difference to hacker attacks is that the operation of a virus occurs automatically. Also, computer viruses and similar programs are able to spread automatically via networks. They infect computer systems by manipulating some executable code in a way that the code sequence belonging to the virus gets executed.

Viruses and hacker attacks have in common that the contents of some storage get changed.

State of the art to prevent virus infection is to apply so-called virus scanning programs. These perform a search for a certain pattern that is believed to identify a virus. Virus scanners can check both, non-volatile storage such as hard discs, and volatile storage as the computer system's RAM.

Unfortunately, the degree of protection achieved this way is limited. Virus scanners can detect virus infections but, in general, do not prevent them. Updates are needed for every new virus which costs money and time. Virus scanners can only detect known viruses which have already been analyzed by some experts, i.e. protection is limited in that a computer system equipped even with the latest virus scanning software is still prone to attacks by newly developed viruses. This is in particular true for "high-tech" viruses that are programmed to fool detection programs. In particular, this concerns self-modifying, polymorphic viruses and encrypted viruses.

Other disadvantages related to the usage of virus scanners are that they may report false positives when a byte sequence attributed to a virus occurs as part of a non-infected file. Also, removing a virus from a computer system is tricky and error-prone because the removal tool must manipulate binary executables.

Yet another way to prevent virus infection is the so-called "trusted computing" approach. Here, services provided by additional hardware calculate a hash value for all files or memory areas that need to be protected. These values are stored by the additional hardware. At some later time, the hash value can be calculated again and compared with the value stored in the additional hardware. If the file or the memory location being protected yields a different hash value during the later scan, it must have been modified.

One disadvantage of this method is that calculating a hash value is a many-to-one mapping, i.e. many different files will yield the same hash value. By chance, or if the developer of the virus gains sufficient knowledge of the way how the hash value is calculated, a virus infection or hacker attack may go undetected. Another disadvantage is that a virus infection may be detected but the method does not prevent an infection. Another disadvantage is the need to have additional hardware which increases cost.

Yet another way to detect virus infection is duplicate storage. Using this approach, any file that needs to be protected is actually stored twice, once in the normal way and a second time on a storage device which is write-protected during normal operation of the computer system. Upon initialization, the file is written to both destinations. Both copies of the file may be compared whenever a check for virus infections needs to be performed. Any difference between the two copies indicates a modification of the working copy. Removing the virus is simple: the infected copy is replaced by the protected copy. Disadvantages of this method are the additional effort for duplicate file storage. Also, the comparison may be time-consuming. The method cannot prevent a virus infection.

One variant of the duplicate storage approach is to save the contents to be protected in a one write-protected partition of the hard disk. This is, however, not secure as the write-protection can be disabled by everyone having administrator privileges.

Known techniques to prevent hacker attacks include using a firewall to protect computer systems from attacks via network. However, this approach will not prevent attacks from people behind the firewall, i.e. the computer system of a certain organization might be attacked by employees of this organization. Also, the firewall is a computer system itself and may not work as intended.

2. SUMMARY AND ADVANTAGES OF THE INVENTION

According to its basic aspect a method for preventing hacker attacks and virus infection in computer systems, wherein the computer system comprises a storage means able to be read from and to be written to, and a means for switching the storage means into a write-protected mode, comprising the steps of:
a) prompting a user to perform a switching allowing temporarily writing to a write-protectable storage area, wherein a respective physical write-protection mechanism comprises a switching means which is exclusively operable from outside of the operating system of said computer system,
b) storing security-relevant information into said write-protectable storage area,
c) prompting a user to perform a manual switching to restrict writing to said write-protectable storage area, thus resulting in generating a write-protected storage area,
d) restricting any write access to said write protected storage area, i.e. disabling writing thereto, in response to the manual switching during further runtime of the computer system.
Further, the following steps are performed:
managing before the start of a program referencing the information, which information is stored in which area,
d) running the program comprising both, security-relevant information and non-security-relevant information by accessing respective dedicated areas of the storage.

Figure 3:
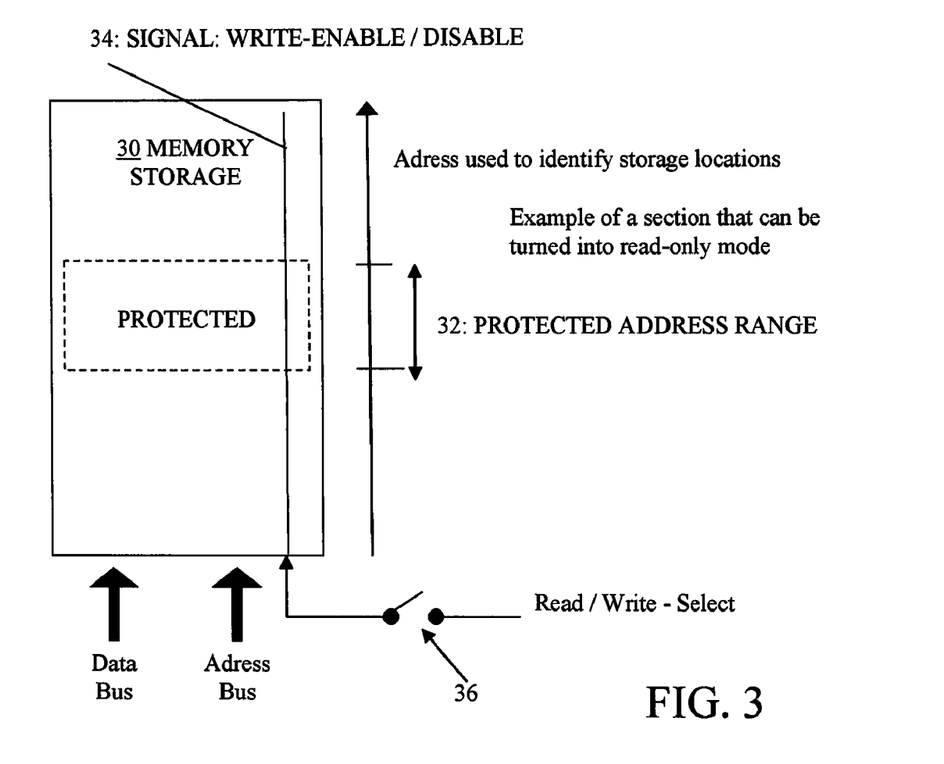
FIG. 3 is a schematic diagram illustrating some memory device having a write-protected memory area according to the present invention.

Thus, the core idea of the present invention applies to storage which can be written to and read from, i.e., is in read-write mode. The invention is to extend the storage hardware with a switch that causes a certain part of the storage to become read-only (FIG. 3). That part of memory that can be turned into read-only mode is named protectable memory.

These extensions to computer hardware and to the implementation of software executed on the computer actually prevent unauthorized manipulation of said software, rather than only detecting a manipulation. The disclosed invention helps against any virus and does not depend on viruses being analyzed by experts. The present invention also prevents hackers from changing internals of an operating system in order to be able to log in with administrator privileges.

Further, advantageously, the security-relevant information are components of an operating system of a computer system, and the storage is system memory, wherein the step of storing information into the write-protected memory area is performed when beginning the boot procedure for the operating system, without any write-protection being enabled, and wherein after completing writing to the write-protectable memory area enabling a write-protection mechanism effective to the write-protectable memory area, and completing the boot procedure by storing the rest of the operating system into the non-protectable memory area. This is useful for achieving a safe booting and a safe operating system.

Further, advantageously, when the write-process to the write-protectable storage—often a hard disk or a FLASH ROM area—is performed during installation of an application program, after having defunctionalized said protection temporarily and manually from outside of the operating system, and wherein the storage is a non-volatile memory connected or connectable to the computer system, this yields that any application program can be installed in a safe way, because any executable piece of code or sensible data, i.e., any exe-, dll, dat files having read-only character, such as .dot files or just secret or sensible, private or whatever data, can be installed in the write-protected hard disk or FLASH-ROM area.

The invention applies thus to both, a computer system's main memory, and to non-volatile re-writable mass storage devices. Preferred embodiments of the present invention for these two cases are differently implemented which reveals from the detailed description further below.

3. BRIEF DESCRIPTION OF THE DRAWINGS

The present invention is illustrated by way of example and is not limited by the shape of the figures of the drawings in which.

4. DETAILED DESCRIPTION OF THE PREFERRED EMBODIMENT

With general reference to the figures and with special reference now to FIG. 3 a preferred embodiment of the inventional method and system to protect the system's main memory is described in more detail.

4.1 Protecting Main Memory (RAM)

Protecting a computer system's main memory using the present invention comprises some additions and extensions to a prior art computer system at different levels:

In a first level the computer system hardware needs to provide some memory areas 32 having the property that they can be read like normal RAM but writing is possible only on demand and requires some authorization actions to be performed.

It is essential for safety reasons that the authorization is done outside the scope of the operating system being protected, i.e., system administration privileges must not be sufficient to enable writing. Software-based authorization is acceptable only if the software is not part of the operating system being protected. For example, when running Linux in a VM guest in System z, the write authorization could be given by a VM application, or using the so-called "service element" (SE) in this environment, used to operate prior art "System z" machines, sold by IBM Corporation.

There are several alternatives how the protectable memory areas 32 are accessed. An easy-to-implement and probably most advantageous way is to protect just some address ranges and make no other modifications to the memory architecture. It is, however, also possible to implement special machine instructions for accessing the protected parts of the memory.

There are different solid state and storage technologies that can be used to implement the protection mechanism itself. A simple method comprises to actuate a mechanical switch 36 interrupting the write-enable signal 30 of some memory chips. More sophisticated approaches might allow configuring what address ranges are to be protected during system setup. Using such an approach, the system will store the bounds of the address range to be protected and provide some logic that checks whether a write operation accesses a memory location from within that range.

In a second level the application program or operating system to be protected comprises executable code and data structures. The data structures are separated according to this inventional embodiment into two disjoint classes. The first class contains data structures that need to be modified during normal operation. The second class contains data structures that do not need to be modified during normal operation and need to be protected from unauthorized write accesses.

Security-critical parts of the operating system that might be changed by a virus and/or by hackers are stored according to this inventional embodiment in such a protectable memory area. The data to be saved this way may include some executable code (e.g., Windows or Linux operating system core) as well as critical data structures (e.g. Linux system call table).

With respect to the example used in the introduction (FIGS. 1 and 2), the data structure implementing the system call table 15 will be classified according to this preferred inventional embodiment as "no changes needed during normal operation". Any data structures used by the Linux operating system kernel to administrate the execution of user applications will be classified as "needs to be modified during normal operation".

Many programming languages allow to specify that a certain variable or a certain subprogram is to be located at a certain address. Such mechanisms can be exploited according to this preferred inventional embodiment to implement the protection mechanism disclosed by the present invention.

A further preferred aspect according to this or a further preferred inventional embodiment contains extensions to the programming language used for the implementation of the operating system (e.g., C) and the compiler implementing the language.

The programming language used to implement the operating system will then provide an additional attribute that causes a variable to be stored in the secure memory area, and an attribute that causes a subroutine to be stored in the secure memory area, preferably also an additional attribute that causes a part of a program consisting of both, data and code to be stored in the secure data area. Using the language C as example, a possible solution will be an additional storage class attribute named "secure". A static integer variable intended to be stored in the secure memory area will then be declared as "secure static int i". Similar methods are practicable for functions.

The compiler used to compile the operating system source code needs to evaluate these additional inventional declarations and it needs to map the respective data and executable code into the secure memory area. These areas can either be accessed during special assembler instructions, or they can be stored at a dedicated address area within the system's normal memory address space.

Further according to this preferred inventional embodiment, the operating system's source code is modified such that all parts that could be affected by an attack will be stored into the secure memory area. In case of multi-platform source code like Linux, one may use an attribute implemented using preprocessor-defined symbols which, during target machine configuration, either evaluate to the said storage class attributes or evaluate to just nothing if the target platform does not support secure memory areas.

During normal operation, the code and data stored in these secured memory areas can be referenced as if the memory were just normal RAM. Writing, however, is prohibited according to this preferred inventional embodiment, unless some authorization has taken place from outside of the operating system, or its influence, e.g., by toggling a mechanical switch. When booting the operating system, writing will be enabled. Once the operating system is loaded and initialized, writing will be disabled. Any attempt from hackers targeting to modify parts of the operating system, are thus prevented. In addition, the attempt to write into the special memory area while being write-protected can be displayed preferably as an indication that the system is being attacked.

Further, the binary version of the operating system is organized such that the two classes "write-protected" and "write-allowed" can be distinguished in some way.

Figure 5:
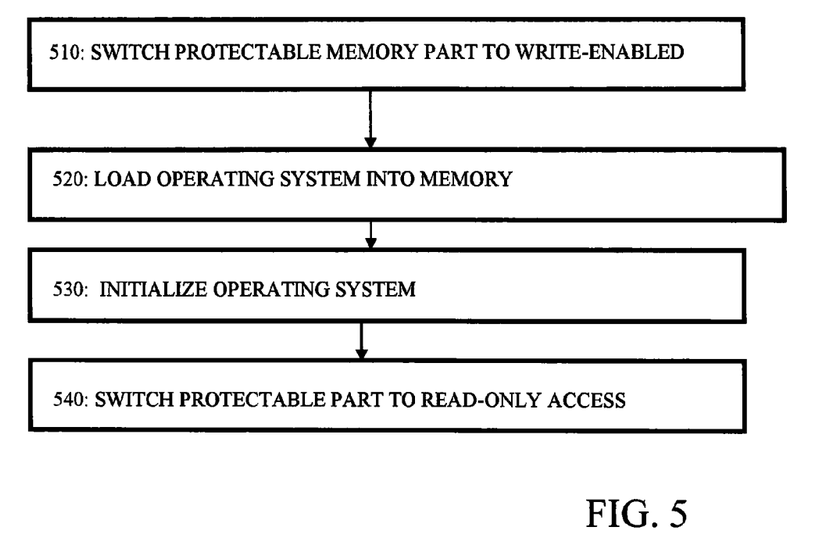
FIG. 5 is a schematic diagram illustrating the control flow of a preferred embodiment of the inventional method when used for performing a protected booting procedure.

Next, and with reference to FIG. 5 the start process of the operating system according to this preferred inventional embodiment is described in more detail:

Starting the operating system on a computer system equipped with the method according to this preferred inventional embodiment proceeds in an environment which is guaranteed to be free of hacker influence, at least when the system uses the inventional method for the first time, as follows:

1. The protectable part of the memory is switched into read-write mode in a step 510.

Figure 4:
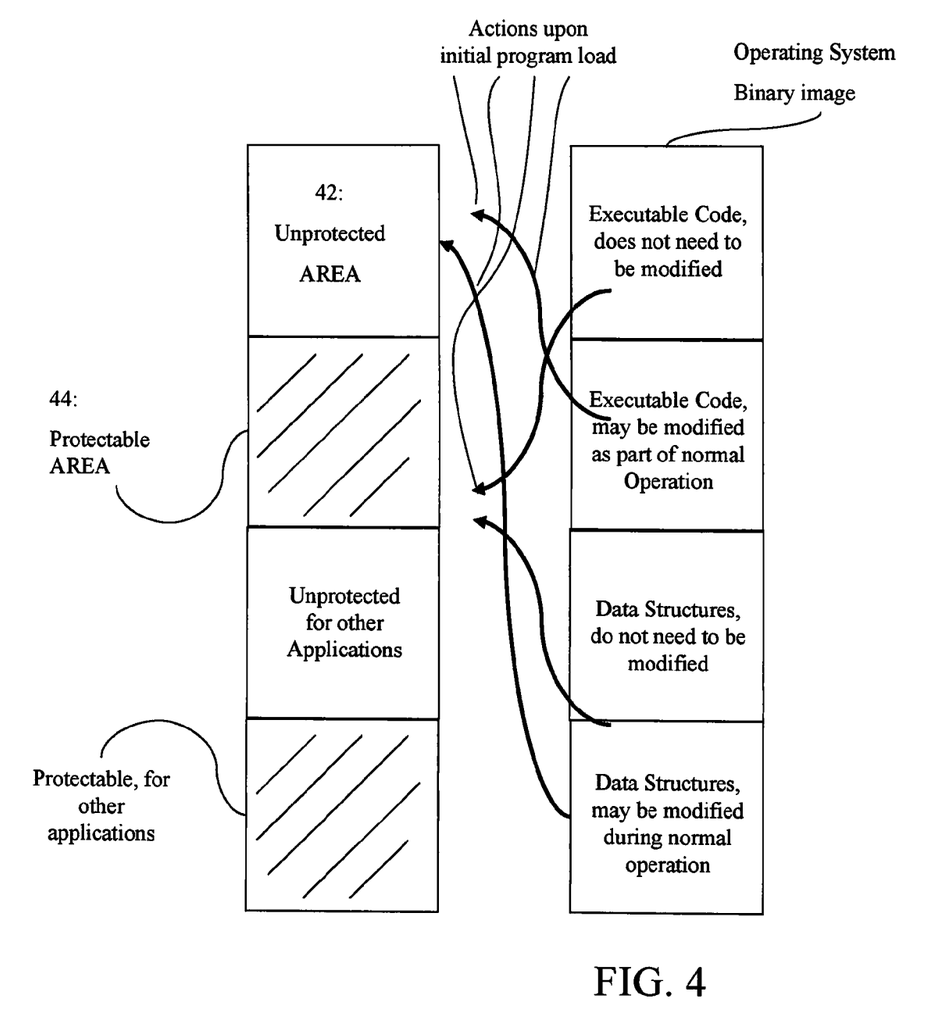
FIG. 4 is a schematic diagram illustrating the location of code of the operating system binary image when applying the inventional method for loading an operating system into protected areas and unprotected areas of the memory during the boot procedure.

2. The operating system is loaded into the memory in a subsequent step 520. FIG. 4 additionally clarifies this step in more detail. Those parts of the operating system that were classified as "may change during normal operation" are loaded into the non-protectable part 42 of the memory. Those parts, however, of the operating system that were classified as "does not need to . . ." or "must not be changed during normal operation" are loaded into the protectable part 44 of the memory.

3. The initialization part of the operating system is then executed in a further step 530.

4. The protectable part of the memory is switched into read-only mode immediately thereafter, step 540.

It is essential that this disabling of write accesses is implemented in hardware or in the software layer that provides the virtual environment for the operating system.

It should be noted that software-based approaches are known in prior art for a long time and have the major disadvantage that they can be circumvented once a hacker gained administrator privileges on the computer system to be protected.

The technical implementation of the protection according to this inventional embodiment depends on details of the memory used. However, this memory will always be able to perform read or write operations and thus will implement a hardware means which possesses the technical property of distinguishing which of the two operations—read or write—is to be executed. State of the art is to have a signal which is set to a voltage level of logically 0 or 1, respectively, to distinguish read and write mode. The switch shown in FIG. 3 is then an electronic device that prevents the read or write access signal sent to the memory device from being set to the voltage that corresponds to write mode.

Next, some variations of the before-described embodiment are described thus disclosing some further embodiments of the inventional matter.

Another further embodiment is based on the idea that the source code of the operating system is enhanced with attributes that are not part of the programming language used to implement the operating system, and specify whether or not some executable code or data structure needs or does not need to be modified during normal operation. The compiler used to compile it is enhanced to accept and evaluate these attributes. While translating the source code into binary form, the compiler organizes that binary form in such a way that protected and non-protected parts of the operating system will be loaded into the appropriate respective parts of the memory.

Another preferred embodiment is based on the idea that the programming language used to implement the operating system is enhanced with some means like new keywords. The programming language's semantics for these keywords include specific notation enabling the compiler used to translate this language into binary form to organize the binary output such that it gets loaded into the appropriated parts of memory. A simple way to do that comprises the teaching that the rules of the programming language must be extended so that the new keyword becomes a valid attribute for variable and/or subprogram declarations. The compiler must be extended so that it knows what actions to take in order to cause a variable or a subprogram to be stored into protectable storage, and it must take this action whenever the respective keyword is given as an attribute for a variable or subprogram declaration.

Another preferred embodiment includes the feature that the output from the compiler (either Assembler source code further processed by an Assembler program, or binary code) is enhanced with information telling which parts are to be loaded in the protectable or non-protectable part of storage, respectively. This information can be provided manually by the developer.

Another possible variant is that the system program that loads the binary of the operating system into memory additionally accepts the information which parts of the binary must be loaded into protectable or non-protectable parts of the memory.

Another preferred embodiment includes the feature to secure not only operating systems but also user application programs.

Another preferred embodiment includes the feature which has a mechanical switch to toggle the protectable memory area between read-write mode and read-only mode.

Another preferred embodiment includes the feature of a switch to toggle the protectable memory area between read-write mode and read-only mode which is operated by some secure input device such as a card reader, or a fingerprint reader.

Another preferred embodiment includes the feature of a computer system which has a switch to toggle the protectable memory area between read-write mode and read-only mode whereby this switch is controlled by a separate computer system which is designed to control operation of the first computer system; this refers to the so-called service element mentioned further above.

Another preferred embodiment includes the feature of a computer system equipped with the present invention which has an additional means to detect if the protectable part of memory is currently positioned in read-only mode but some operation tries to execute a write-operation. When this event is detected, an appropriate signal is sent to the system administrator or some other action is taken.

Another preferred embodiment includes the feature to include virtualized operating systems. If the operating system to be protected is executed by another host operating system, then controlling the first operating system's protectable memory can be performed by operations issued by the host operating system. A typical example is the IBM System z where Linux may execute under control of z/VM as host operating system.

Another preferred embodiment includes the feature of a computer system that declares certain address ranges belonging to the computer's address space as protectable.

Another preferred embodiment includes the feature of a computer system that provides separate address spaces some of which are protectable.

4.2 Protecting Non-Volatile Storage Devices

Next, the inventional aspect of protecting non-volatile mass storage devices will be described in more detail in a further embodiment which can be combined with one or more of those which were described above.

The term "non-volatile" mass storage memory subsumes storage technology such as hard disks, re-writable CDs and DVDs, re-writable ROM variants such as EEPROMS and FLASH ROM.

The core idea of how to protect information stored on such devices is similar to that one described above for memory, namely comprises the teaching to enhance them with a mechanism that can change a part of the storage into a read-only mode while the remaining part of the storage remains in read-write mode. When in read-only mode, the secure memory device cannot be written by the operating system nor by any program executing on the computer system.

The software installed on the computer system is divided up into two parts: those executable files which are endangered by virus infection are stored in the protectable memory, while other files which may needed to be changed during normal program execution are stored on a storage device which remains in read-write mode.

It is essential that operating system administrator privileges are not sufficient to enable writing but rather, some mechanisms involving additional hardware are needed. This can be just a mechanical switch, or some actions initiated by a separate operator console like the System z "service element" (SE).

The protectable storage is used to store files that might be affected by virus infections. For example, this can include the core of the Windows operating system as well as executable files belonging to some application program. Ideally, software packages would be designed such that its files are classified as either "need to be modified during normal execution" or as "executable code that should remain unchanged during normal operation". An installation program would handle both kinds of files accordingly.

A major advantage of this particular aspect of the present invention is that every file is stored only once and does not require calculating and storing additional information. The invention does neither use backup copies nor does it require calculating and storing "fingerprints" of files derived from hash values.

Additionally, adding write protection to a hard disk is easy to handle, as there are some internal lines or signals, respectively that can be made switchable:

The core of a hard disk is a rotating disk with information stored in its magnetic surface. When reading, a coil is moved close to the surface and the rotating magnetic patterns induce a current which is then further processed and finally yields the required binary information. When writing, however, a write-current is applied to the coil in order to generate a magnetic field which then changes the magnetic properties of the disk area under the coil and thus writes information on the hard disk. Thus, the issue is to control this current manually, or at least from outside of the operating system and from outside of any application program.

According to a preferred aspect of the invention an entire partition of a hard disk is protected by the inventional method, or an entire hard disk. The file allocation table or any equivalent list is basically organized as it is known from prior art.

Next, some installation issues are described in more detail, relevant when using this embodiment of the inventional method:

Software packages using this embodiment will separate all files belonging to a software package into the above described two different classes. The first class consists of files that do not need to be changed during normal operation by a user but only during installation, and the second class consists of files that may need changes during normal operation.

Figure 6:
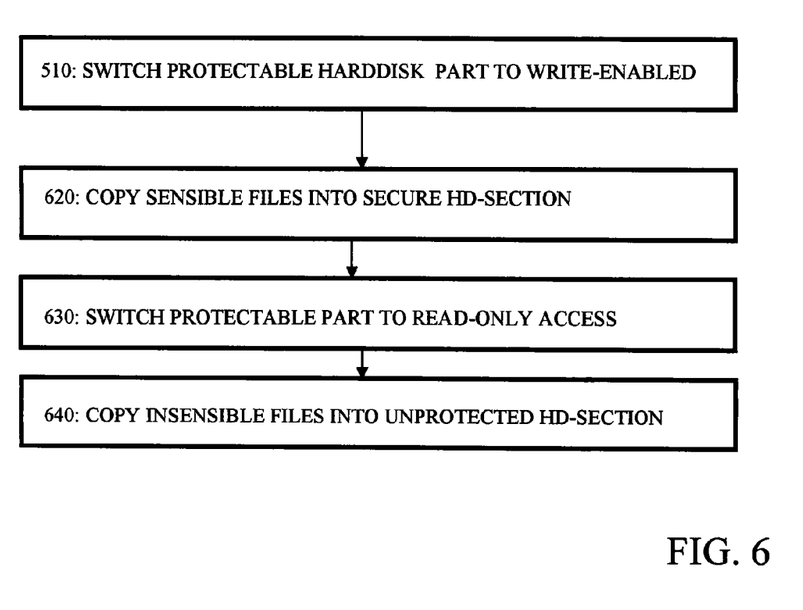
FIG. 6 is a schematic diagram illustrating the control flow of a preferred embodiment of the inventional method when used for performing a protected installation procedure for an application program.

The control flow of the installation of such a software package on a computer system is depicted in FIG. 6 and comprises then the following steps:

Step 610: The operator enables writing for the "secure hard disk section" by activating a lever, which performs the physical switching.

Step 620: The installation routine for the software package is started and copies all sensible files into the "secure section". "sensible" is coded by the above mentioned classification, e.g., a bit flag appended to the header of a file for example, when the installation is done via a network (Internet), or by a pre-specified storage location on a CD-ROM used for the installation.

Then in a step 630, the user is prompted to switch the lever in order to activate the write protection of the secure section of the hard disk.

Then in a subsequent step 640 the installation routine will copy the insensible files which may be changed, wherein those changes being regardable as not being seriously endangering the application operation, onto the unprotected hard disk section, step 640, depending again on said classification.

Further, according to a preferred aspect of the invention the inventional method also enables for handling software packages that were initially not designed to support any kind of protectable memory:

For software packages thus not designed to exploit the present disclosure, the following procedure may advantageously be applied.

1. The operating system and/or application programs are installed on a computer system's hard disk as usual—i.e., like one would install them on a computer system not equipped with the inventional method.
2. Then a security program is started and takes as input parameter a list of all files that fulfil each of the following properties:
 (a) the file was installed during step 1;
 (b) the file can be infected by a computer virus;
 (c) the file will not be modified during normal operation.
The security program copies these files into the protectable storage. The list of files is created manually by a programmer.
3. Depending on the internal structure of the software being installed, access paths are adjusted so that those files moved into the secure memory can be accessed properly.

Note that step 3 might be impossible, thus this particular method can not be applied to every software package.

Next, further variations of this inventional embodiment are disclosed as follows:

Another preferred embodiment includes the feature of a computer system equipped with two separate storage devices one of which is protectable. These devices can be hard disks, flash ROM or any other non-volatile storage.

Another preferred embodiment includes the feature of partitioning the storage area provided by one storage device into separate sections some of which can be turned into read-only mode and thus be made protectable.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The invention claimed is:

1. A method for preventing hacker attacks and virus infection in a computer system comprising:
   when performing a boot procedure for an operating system of said computer system, allowing temporarily writing to a write-protectable area of addressable system memory, said write-protectable area of system memory comprising at least one limited range of addresses of said system memory and being fewer than all the addresses in said system memory, wherein said write-protectable area of addressable system memory is write-protected by a physical write-protection mechanism comprising a physical write-enable/disable signal line transmitting a signal voltage to said write-protectable area of system memory, said signal voltage being selectable by a switching means which is exclusively operable from outside of said operating system of said computer system;
   storing a first portion of said operating system containing security-relevant information into said write-protectable area of system memory;
   prompting a user to perform a manual switching to restrict writing to said write-protectable area of system memory, thus resulting in generating a write-protected area of system memory;
   restricting any write access to said write protected area of system memory in response to said manual switching during further runtime of said computer system;
   storing a second portion of said operating system different from said first portion in an area of said system memory which is not write-protectable to complete said boot procedure; and
   after said restricting any write access to said write-protected area of system memory and said storing a second portion of said operating system different from said first portion, reading data in said first and second portions and writing data to said second portion to operate said operating system during runtime of said computer system.

2. The method according to claim 1, wherein a write-process to the write-protectable area of system memory is performed during installation of an application program, after having manually defunctionalized said write protection responsive to prompting a user to manually perform a switching, said application program having a first program portion which is stored in said write-protectable area of system memory and a second program portion which is stored in said area of system memory which is not write-protectable.

3. The method according to claim 1, wherein said switching means includes the actuation of a mechanical switch connected or connectable the computer system.

4. The method according to claim 1, wherein said switching means is implemented in a software layer that provides a virtual environment for said operating system.

5. The method according to claim 1, further comprising:
   issuing an alarm when an attempt is detected to write to the write-protected area of system memory after the write-protection mechanism has been enabled.

6. An electronic computer system comprising:
   an addressable system memory that is able to be read from and written to, said system memory containing a write-protectable area comprising at least one limited range of addresses of said system memory, said write-protectable area being fewer than all the addresses in said system memory;
   a physical write-protection mechanism protecting said write-protectable area of system memory, said physical write-protection mechanism comprising a physical write enable/disable signal line transmitting a signal voltage to said write-protectable area of system memory and coupled to a means for switching said write-protectable area of system memory into a write-protected mode, said switching means being exclusively operable from outside of an operating system of said computer system;
   a non-volatile storage for storing said operating system for said electronic computer system, said operating system containing a first portion having security-relevant information and a second portion different from said first portion;
   means for prompting a user to perform a switching allowing temporarily writing to said write-protectable area of system memory;
   means for prompting a user to perform a manual switching to restrict writing to said write-protectable area of system memory after storing said first portion of said operating system in said write-protectable area of system memory,
   wherein said first portion of said operating system is stored in said write-protected area of said system memory during a boot procedure while said write-protectable area of system memory is temporarily switched into a non-write-protected mode;

wherein said second portion of said operating system is stored in an area of said system memory which is not write-protectable to complete said boot procedure.

7. A computer program product comprising a non-transitory computer useable storage medium including a computer readable program, wherein the computer readable program includes a functional component that when executed on a computer causes the computer to perform the steps of:

when performing a boot procedure for an operating system of said computer system, prompting a user to perform a switching allowing temporarily writing to a write-protectable area of addressable system memory, said write-protectable area of system memory comprising at least one limited range of addresses of said system memory and being fewer than all the addresses in said system memory, wherein said write-protectable area of addressable system memory is write-protected by a physical write-protection mechanism comprising a physical write-enable/disable signal line transmitting a signal voltage to said write-protectable area of system memory, said signal voltage being selectable by a switching means which is exclusively operable from outside of said operating system of said computer system;

storing a first portion of said operating system containing security-relevant information into said write-protectable area of system memory;

prompting a user to perform a manual switching to restrict writing to said write-protectable area of system memory, thus resulting in generating a write-protected area of system memory;

restricting any write access to said write protected area of system memory in response to said manual switching during further runtime of said computer system;

storing a second portion of said operating system different from said first portion in an area of said system memory which is not write-protectable to complete said boot procedure; and after said restricting any write access to said write-protected area of system memory and said storing a second portion of said operating system different from said first portion, reading data in said first and second portions and writing data to said second portion to operate said operating system during runtime of said computer system.

* * * * *